Sept. 9, 1930.    G. W. BLAIR    1,775,418
FASTENING DEVICE
Filed Feb. 5, 1926
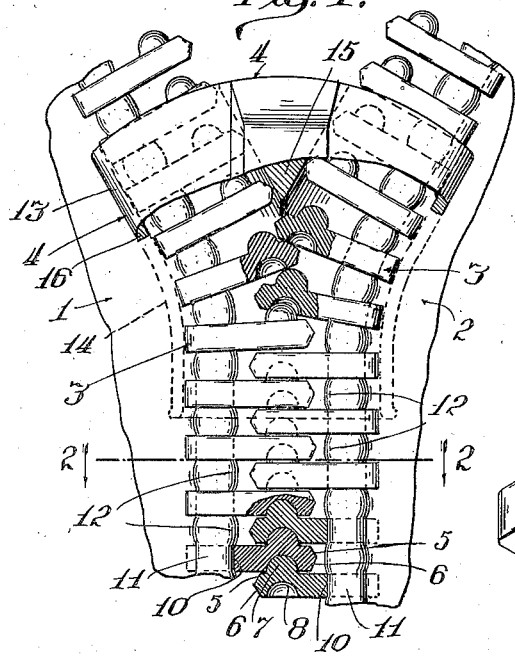
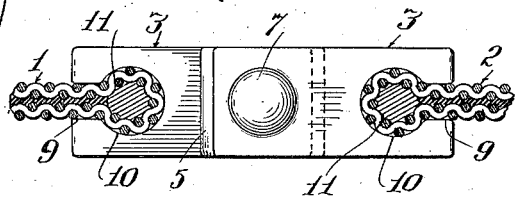
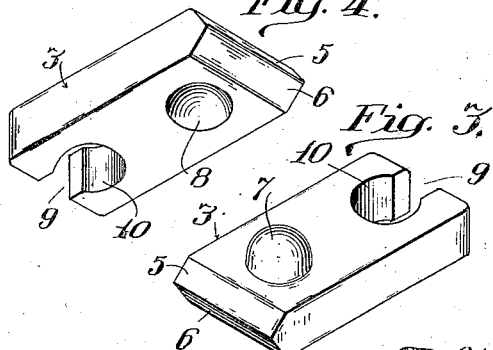
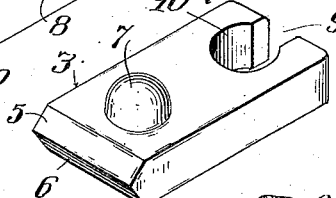
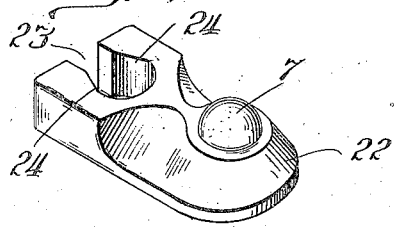
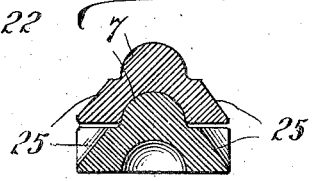
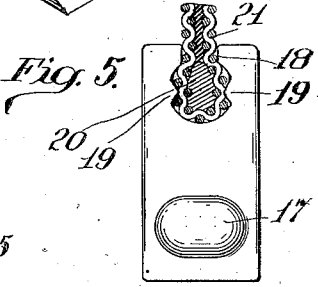
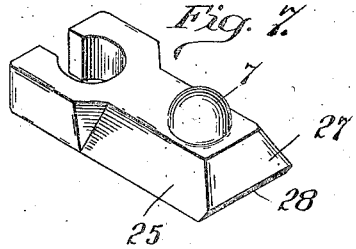
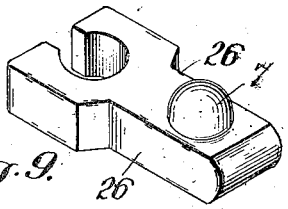
Inventor
George W. Blair
By Eugene M. Giles
Attorney Patented Sept. 9, 1930

1,775,418

UNITED STATES PATENT OFFICE

GEORGE W. BLAIR, OF MISHAWAKA, INDIANA, ASSIGNOR TO MISHAWAKA RUBBER AND WOOLEN MANUFACTURING COMPANY, OF MISHAWAKA, INDIANA, A CORPORATION OF INDIANA

FASTENING DEVICE

Application filed February 5, 1926. Serial No. 86,142.

My invention has reference more particularly to fastening devices of the type wherein opposed series of fastener elements are arranged on the edges of the parts to be connected and are adapted to be interlocked and released by movement of a cam member or slider therealong.

In fastening devices of this character it is required in many cases, as for example when used on overshoes and other footwear, that the interlocked fastener shall be capable of lateral flexing or bending to a considerable extent and it is desirable to construct the elements so as to facilitate such flexing and bending and also to avoid excessive strain or cramping action on the elements when the interlocked fastener is bent or doubled over to the fullest extent.

With my invention, the fastener elements are of a simple form comprising elongated flat plates which are attached to a stringer at one end, and adjacent their other ends (which are herein referred to as their outer ends) these elements are formed at one side with a boss or projection midway between the lateral edges of the element and at the other side with a corresponding depression so that the elements interlock by engaging the projections of each series of elements in the depressions of the elements of the other series. The bosses or projections seat in the depression so as to space the side portions of the adjoining elements sufficiently to permit a rocking or pivotal action therebetween and at such times the engaged boss and projection serves as a bearing or fulcrum in the rocking or pivotal action. The elements are of suitable thickness to afford a sufficient number of joints or points of rocking or pivotal action per linear inch so as to provide ample flexibility, and it will be understood that the flexibility may be increased or diminished by varying the thickness of the elements and accordingly the number thereof per linear inch. Another advantage attained by using a large number of fastener elements per linear inch is that there are a large number of points of interlocking and the amount of separating strain on each pair of interlocked elements is accordingly diminished. I have also provided for further increase in flexibility by narrowing the portions of the elements which overlap when the fastener is interlocked, or this same result may be accomplished by beveling or rounding off the side edges of the overlapping portions of the elements.

Moreover, with my invention provision is made to avoid excessive strain or cramping action between the interlocked fastener elements when the fastener is bent or doubled over to the fullest extent. To this end, the stringer is made with an enlarged or corded edge of suitable character, according to the spacing of the fastener elements so that when the latter are clamped thereon, the enlarged edge bulges or puffs out between the fastener elements, affording in effect a filler therebetween which, in the lateral bending of the fastener, acts as a cushion to limit the bending or flexing. Thus when the fastener is doubled over the bending strain is assumed or sustained by the corded or enlarged edge of the stringer, and cramping action between adjoining elements or opening strain is avoided. Moreover this corded or enlarged edge serves in the interlocking and releasing of the elements, to insure a corresponding or uniform divergent adjustment or movement of the elements on both sides as the slider is moved therealong and consequently the opposed elements are accurately fanned out so that they enter readily into the interlocking position without interference or jamming which would occur if the relative movement of the opposed elements by the slider was not positively controlled.

The principal objects of my invention are to provide an improved fastener of a simple form; to insure ample flexibility; to prevent excessive cramping action or opening strain on the elements when the fastener is doubled over to the fullest extent; to provide a cushioning means between the elements for limiting the bending of the fastener; to insure proper relative movement of the opposed elements by the slider; to mount the elements on a stringer in an improved manner so as to prevent shifting or displacement; and in general to produce a simple and dependable fastener which may be conveniently and economically manufactured and in which a high degree of flexibility is obtained without straining or cramping the fastener, or affecting the security of the interlocking.

On the drawings,—

Fig. 1 is a fragmentary front view of a fastener device embodying my improvements with parts broken away and in section to disclose details;

Fig. 2, an enlarged sectional view on the line 2—2 of Fig. 1;

Figs. 3 and 4, top and bottom perspective views respectively of the elements shown in Figs. 1 and 2;

Fig. 5, a plan view of a modified form of the fastener element;

Fig. 6, a perspective view of another modified form of the fastener element;

Fig. 7, a perspective view of another modified form of the fastener element;

Fig. 8, a transverse sectional view of a pair of interlocked elements like that shown in Fig. 7; and Fig. 9, a perspective view of another modified form of a fastener element.

Referring to Figs. 1 to 4 inclusive of the drawings, the reference numerals 1 and 2 indicate the two parts which are to be connected, each of these parts being provided on the edge with a series of fastener elements 3 which are interlocked and released by movement of a cam member or slider 4 along the series of elements.

The elements 3 on the parts 1 and 2 are alike in construction and are in the form of an elongated flat plate as shown in Figs. 3 and 4 having the outer end beveled as indicated so as to afford oppositely inclined faces 5 and 6, or are otherwise formed to facilitate the insertion of the elements on the one side between the elements on the other side.

Each of the elements 3 is formed adjacent the outer end on one side with a boss or projection 7 which is set back from the beveled end 5—6 of the element and positioned midway between the lateral edges of the element, and on the opposite side of the element 3 is a correspondingly positioned depression or recess 8, the arrangement being such that when the outer ends of the elements of one series are inserted between the outer ends of the elements of the other series, the projections 7 on the elements of each series engaged in the depressions 8 of the elements of the other series and the elements are thereby interlocked.

The projections 7 and recesses 8 are correspondingly rounded so as to form a pivot bearing or fulcrum which affords a rocking action between the interlocked elements and the elevation of the projection 7 is sufficiently greater than the depth of the depression 8, or otherwise arranged so that when the projections and recesses are engaged, the portions of the adjoining elements at opposite sides of the projections and recesses are spaced apart sufficiently to permit such rocking action and thereby provide the flexibility or lateral bending which is required in fasteners of this character. The degree of flexibility or lateral bending of which the fastener is capable depends to a great extent on the number of pivot points per linear inch and the elements 3 are therefore made of a comparatively thin stock which also permits the projection 7 to be stamped out or formed by the same operation which forms the depression 8.

For mounting the fastener elements 3, the ends thereof remote from the projections 7 are formed with a slot 9 having an enlarged throat portion 10 providing jaws which are clamped on the enlarged edge 11 of the parts 1 and 2, and this enlarged edge 11 is not only substantially non-stretching so as to hold the elements in accurate spaced relation but it is of sufficient thickness and suitable construction to resist extreme bending or doubling over of the fastening device mounted thereon. To this end the enlarged edge 11 is preferably such that when the elements 3 are clamped thereon, the portion of the edge 11 between adjoining elements bulges or puffs out somewhat as shown at 12 in Fig. 1, forming a filler which serves as a cushion between adjoining elements when the fastener is bent or doubled over to the fullest extent required. In this way the bending strain is assumed or sustained by the edge 11 and excessive strain on or cramping action between the adjoining elements of the interlocked fastener is thereby avoided. Moreover an edge of this character insures a uniform divergent adjustment of the elements as the slider is operated therealong and proper relative movement of the opposed elements is assured so that the elements on one side enter readily between the elements of the other side without interference or jamming.

The slider 4 for interlocking and releasing the opposed elements 3, is of substantially the usual form comprising front and rear plates or wings 13 and 14 respectively which are secured together with a wedge shaped member 15 between the upper ends. The lateral edges of the plates or wings 13 and 14 are turned inwardly as at 16 in the usual manner so as to form divergent channels merging into a single channel at the lower end of the slider for guiding the opposed series of elements 3 inwardly into interlocking position when the slider is moved in one direction and for deflecting the two series of elements laterally and releasing same when the slider is operated in the reverse direction.

In Fig. 5 I have shown a form of fastener element which is substantially the same as those of Figs. 1 to 4 except that the projection 17 is elongated laterally somewhat so as to have an elliptical form, and the depression in the reverse side of the element is correspondingly formed. With this construction relative swinging movement of the two series of fastener elements around a longitudinal axis is prevented.

In said Fig. 5 I have also shown the mounting slot 18 formed with a pair of projections or ribs 19 which are adapted to embed in the enlarged edge 20 of the mounting tape or stringer 21 to prevent slipping or displacement of the elements on the stringer.

For increasing the flexibility of the fastener, if desired, I have shown in Figs. 6 to 9 inclusive a number of modifications whereby the result may be accomplished. It consists essentially in cutting away lateral portions of the elements at each side of the projection 7 where the opposed elements overlap in the interlocked position so as to permit greater rocking action between the adjoining interlocked elements without any cramping action between the lateral edges thereof. In Fig. 6 the end and sides of the element are rounded in what may be termed a "quarter round" form as indicated at 22 and this rounded edge extends back toward the mounting end of the element beyond the end of the opposed element when the latter is interlocked therewith and this rounded edge at opposite sides of the projection 7 permits a greater degree of lateral tilting or hinging action without cramping than is afforded by elements constructed as shown in Figs. 3 and 4. Moreover, the rounded forward end of the element of Fig. 6 serves to guide the opposed element up onto the projection 7 for interlocking therewith. In this Fig. 6 I have also shown the mounting slot 23 having a throat portion with divergent flat faces 24 arranged at opposite sides to interlock with the corded or enlarged edge of the stringer and hold the element more securely in place thereon if desired. Many other forms of the throat may be employed, as for example square, octagonal or other form which is a departure from the round form of Figs. 2, 3 and 4.

In the structure of Figs. 7 and 8 the increased flexibility is accomplished by beveling the lateral edges of the element as indicated at 25 and in Fig. 9 the same result is accomplished by entirely cutting away the side portions of the element at each side of and at a short distance from the projection 7 as indicated at 26 so that the overlapping portions of the opposed elements are narrower than the mounting end of the element.

In Fig. 7 I have also shown a modified form of the end of the fastener, which consists in beveling almost the entire end of the element one way as indicated at 27 with only a narrow beveled face at 28 so that the face 27 serves to guide the opposed interlocking element up to the projection 7. Fig. 9 also shows another modification which consists in rounding the outer end of the fastener element as indicated at 25.

From the foregoing it will be observed that the elements which I employ are of a simple form which afford a secure and dependable interlocking engagement and that the interengaging parts provide, in effect, a ball and socket joint which insures free relative rocking movement of the interlocked elements and affords a high degree of flexibility in lateral bending or doubling over of the fastener. By beveling or cutting away the portions of the elements at opposite sides of the projection, the shoulder or edge at the opposite sides of the projection is reduced so that ample relative angular adjustment of the interlocked elements is obtained without contact between or cramping of the lateral portions of adjoining elements and when the fastener is composed of a considerable number of elements per linear inch the fastener may be doubled over very sharply without excessive cramping strain between the elements or danger of slipping laterally out of engagement. Moreover when the corded or enlarged edge of the stringer on which the elements are mounted, is constructed as above described, the said edge has a cushioning effect as the fastener is doubled over to the fullest extent and serves to limit the bending or doubling over beyond the point of required flexibility.

While I have shown and described my invention in a preferred form, I am aware that various changes and modifications may be made without departing from the principles of my invention the scope of which is to be determined by the appended claims.

I claim:

1. In a fastening device of the class described, the combination of opposed series of fastener elements, a mounting stringer for each series of elements and a slider operable therealong for interlocking and releasing same, said elements comprising flat elongated plates having projections and recesses at opposite sides respectively adjacent the outer ends for interlocking respectively with recesses and projections of the other series of elements, and said elements being cut away at each side of the projection and between the projection and stringer to afford clearance in lateral bending of the interlocked series of fastener elements, said recesses and projections being located to interlock midway between the two stringers.

2. In a fastening device of the class described, the combination of a pair of stringers each having a series of fastener elements thereon and a slider operable along the two series of fastener elements for interlocking and releasing same, each of said elements consisting of an elongated flat plate with parallel top and bottom faces and having mounting means at one end engaging the stringer and having at the other end a projection at the upper side and a recess in the lower side, said top face being narrower at the projection than the bottom face at the recess.

3. In a fastening device of the class described, the combination of a pair of stringers each having a series of fastener elements thereon and a slider operable along the two series of elements for interlocking and releasing same, each of said elements consisting of an elongated flat plate with parallel top and bottom faces and having mounting means at one end engaging the stringer and having at the other end a projection at the upper side and a recess in the lower side, said top face being narrower at the projection than the bottom face at the recess, and said top face being narrower between the projection and the stringer than the corresponding portion of the under face.

GEORGE W. BLAIR.